United States Patent
Minelli et al.

(10) Patent No.: US 6,595,608 B1
(45) Date of Patent: Jul. 22, 2003

(54) WATER-TIGHT CLOSURE FOR AN OPENING IN AN ELECTRONIC DEVICE

(75) Inventors: Jeffrey D. Minelli, Olathe, KS (US); Robert M. Kalis, Overland Park, KS (US); Brian Poindexter, Gardner, KS (US)

(73) Assignee: Garmin Ltd. (KY)

( * ) Notice: Subject to any disclaimer, the term of this patent is extended or adjusted under 35 U.S.C. 154(b) by 7 days.

(21) Appl. No.: 09/874,762

(22) Filed: Jun. 5, 2001

(51) Int. Cl.[7] .............................................. A47B 96/00
(52) U.S. Cl. ........................................ 312/296; 16/336
(58) Field of Search ................................ 312/296, 326, 312/327, 328, 329, 223.1, 223.2, 7.1; 16/336, 335

(56) References Cited

U.S. PATENT DOCUMENTS

| | | | | |
|---|---|---|---|---|
| 4,110,552 A | * | 8/1978 | Lombardi .............. 174/35 MS |
| 4,180,177 A | * | 12/1979 | Gunderman et al. ........ 220/230 |
| 4,889,209 A | * | 12/1989 | Sears .......................... 181/200 |
| 5,068,765 A | * | 11/1991 | Nimpoeno .................... 16/334 |
| 5,160,357 A | * | 11/1992 | Faber ........................ 220/4.02 |
| 5,255,965 A | * | 10/1993 | Chen et al. .................... 16/260 |
| 5,715,575 A | * | 2/1998 | Kubota .......................... 16/336 |
| 5,800,028 A | * | 9/1998 | Smith et al. .................. 16/277 |
| 5,924,782 A | * | 7/1999 | Park ............................. 16/342 |

* cited by examiner

*Primary Examiner*—Janet M. Wilkens
(74) *Attorney, Agent, or Firm*—Devon A. Rolf

(57) ABSTRACT

An apparatus and method for sealing an opening in a structure, e.g., an electronic device, are provided. The apparatus includes a cover, a fastening member and a receiving member. The cover is adapted to be pivotally coupled with the structure and positioned over the opening. The fastening member is adapted to be coupled with the cover and the receiving member is adapted to be coupled with the structure. The receiving member is further adapted to selectively engage the fastening member providing a water-tight seal over the opening. In one embodiment, the apparatus further includes a biasing member for selectively biasing the cover in one of two positions.her includes a biasing member for selectively biasing the cover in one of two positions.

16 Claims, 4 Drawing Sheets

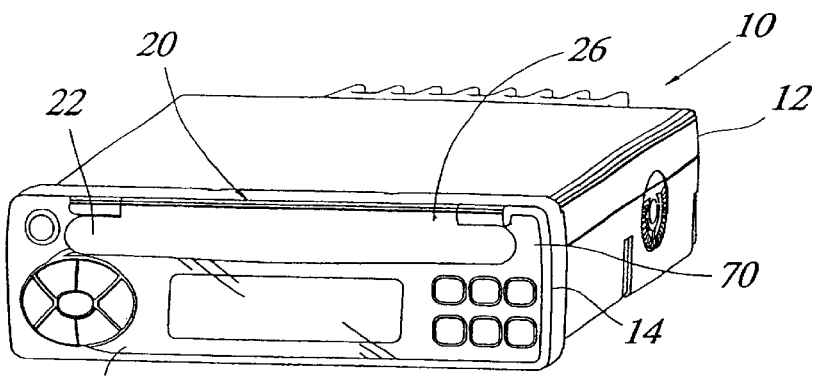
FIG. 1.
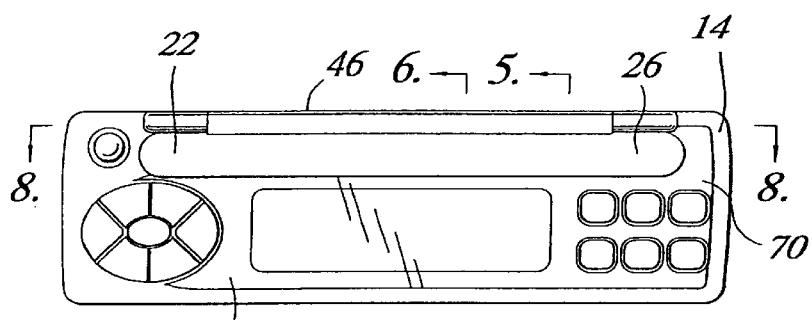
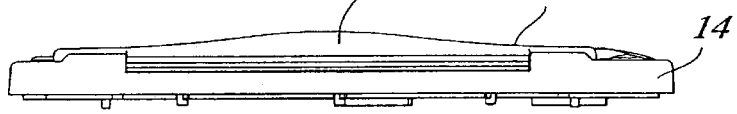
FIG. 3.    FIG. 2.
FIG. 5.
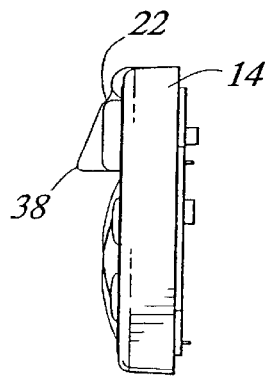 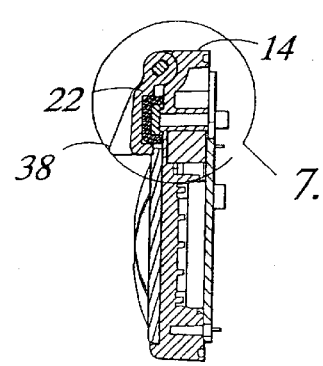 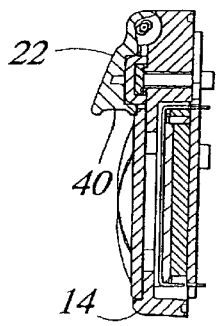
FIG. 4.    FIG. 6.

WATER-TIGHT CLOSURE FOR AN OPENING IN AN ELECTRONIC DEVICE

STATEMENT REGARDING FEDERALLY SPONSORED RESEARCH OR DEVELOPMENT

Not Applicable.

CROSS-REFERENCE TO RELATED APPLICATIONS

Not Applicable.

FIELD OF INVENTION

This invention relates to a cover for an opening in an electronic device. More particularly, this invention relates to a cover for closing an opening in an electronic device which provides a water-tight seal and thus prevents water from entering through the opening.

BACKGROUND OF INVENTION

The use of electronic devices in vehicles, including marine vehicles, has become increasingly popular in recent years. For example, Global Positioning Systems (GPS), radar, plotters, and stereo equipment have become commonly available options for various types of marine vehicles. Typically, such devices include one or more openings therein which are adapted to accept various accessories or components of the device, e.g., compact discs, cassettes and other communication devices. Obviously, when these electronic devices are operating in a marine environment, there is an increased risk that water will enter the opening and damage the internal components of the device and/or cause the device to short circuit.

Various attempts have been made to eliminate the risk of water damage to electronic devices utilized on marine vehicles. For instance, some electronic devices include a retractable shield or dome which covers the face of the device. Typically, such a retractable shield is a transparent member which covers the entire face of the device and deflects water away from the opening. However, this design has a number of weaknesses. For instance, because the shield extends over the entire face, it must be retracted for a user to gain access to the display or to the device itself. Thus, they make it difficult for a user to access the device and/or view any information displayed thereon. In addition, the display may be difficult to view when the shield is in position due to light reflected from the surface of the shield or dome.

Alternatively, some electronic devices have been engineered to incorporate a removable face plate which also acts to deflect water away from the opening. However, such devices also suffer various downfalls. For example, such devices do not provide a water-tight seal and thus water may still enter the opening, especially when the device is subjected to a large volume of water. Further, because the face plate is removable, there may be a gap or opening between the face plate and the housing of the electronic device. This gap allows for the possibility that water may penetrate the outer edge of the face plate and enter the opening damaging the internal components of the device.

Accordingly, there remains a need for a cover for an opening in an electronic device which provides a water-tight seal and thus prevents water from entering the opening. In addition, there remains a need for an apparatus that allows easy access to the electronic device while simultaneously providing protection from water entering an opening in the device. Further, there remains a need for a water-tight closure apparatus which does not unduly hinder visibility of an electronic display.

SUMMARY OF THE INVENTION

Accordingly, in one of its aspects, the present invention provides an apparatus for sealing an opening in a structure.

In another of its aspects, the present invention provides an apparatus for sealing an opening in an electronic device and diverting water away from the opening.

In still another of its aspects, the present invention provides a method and apparatus for forming a water-tight seal over an opening in an electronic device.

According to the present invention, the foregoing and other aspects are achieved by an apparatus for sealing an opening in a structure, the apparatus comprising a cover, a fastening member and a receiving member. The cover is adapted to be pivotally coupled with the structure and positioned over the opening. The fastening member is adapted to be coupled with the cover. The receiving member is adapted to be coupled with the structure. The receiving member is further adapted to selectively engage the fastening member thus providing a water-tight seal over the opening.

The present invention further provides an apparatus for sealing an opening in an electronic device and diverting water away from the opening, the apparatus comprising a cover, a fastening member and a plurality of receiving members. The cover is adapted to be positioned over the opening and the fastening member is adapted to be coupled with the cover. Each receiving member is adapted to be coupled with the electronic device and is magnetically attracted to the fastening member. When the receiving members and the fastening member are not coupled with one another, the fastening member and the receiving members have substantially no polarity. When the fastening member and the receiving members are coupled with one another, the fastening member and the receiving members have sufficient polarity such that they form a seal that prevents water from entering the opening in the electronic device.

The present invention also provides an apparatus for providing a water-tight closure over an opening in an electronic device, the apparatus comprising a cover, fastening means and receiving means. The cover is adapted to be positioned over the opening, the fastening means is adapted to be coupled with the cover and the receiving means is adapted to be coupled with the electronic device. The receiving means is further adapted to selectively engage the fastening means.

The present invention further provides a method for forming a water-tight seal over an opening in an electronic device having a cover, a fastening member and a receiving member. The method comprises positioning the cover over an opening in the electronic device, coupling the fastening member with the cover, coupling the receiving member with the electronic device and engaging the fastening member with the receiving member such that water is prevented from entering the opening.

The present invention also provides an apparatus for providing a water seal over an opening in an electronic device, the apparatus comprising a cover, a fastening device, sealing means for preventing water from entering the opening and receiving means. The cover is adapted to fit over the opening in the electronic device and the fastening device is adapted to be coupled with the cover. The receiving means is adapted to be coupled to the electronic device and is magnetically attracted to the fastening device. When the receiving means and the fastening device are coupled with one another, the sealing means prevents water from entering the opening in the electronic device.

Additional objects of invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means and instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are employed to indicate like parts in the various views:

FIG. 1 front perspective view of an electronic device having a water-tight door coupled therewith in accordance with a preferred embodiment of the present invention;

FIG. 2 is a front elevational view of the face plate illustrated in FIG. 1 with the watertight door in the closed position;

FIG. 3 is a plan view of the face plate illustrated in FIG. 2;

FIG. 4 is a side elevational view of the face plate illustrated in FIG. 2,

FIG. 5 is a cross-sectional view taken generally along line 5—5 of FIG. 2 showing the water-tight seal formed between the housing of the electronic device and the door covering the opening in the device;

FIG. 6 is a cross-sectional view taken generally along line 6—6 of FIG. 2 showing the mechanism for opening and closing the water-tight door;

DETAILED DESCRIPTION OF THE PREFERRED EMBODIMENT

Figure 7:
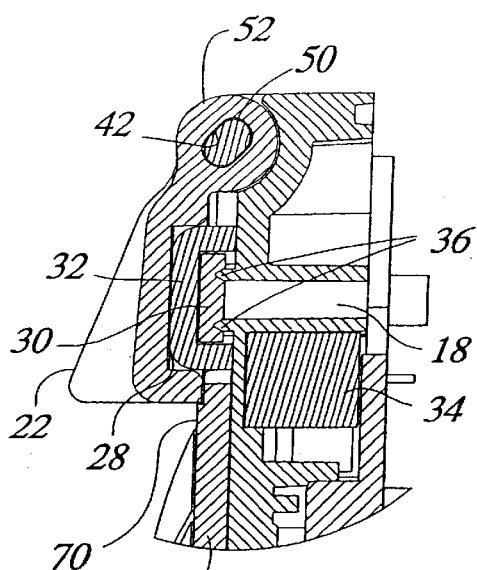
FIG. 7 is enlarged view of the area encompassed by line 7 of FIG. 5.

The present invention is directed to a water-tight closure for an opening in an electronic device. The particular embodiments described herein are intended in all respects to be illustrative rather than restrictive. Alternative embodiments will become apparent to those skilled in the art to which the invention pertains without departing from its scope.

Referring to the drawings in general and initially to FIG. 1 in particular, an exemplary electronic device employing principles of the present invention is shown and designated generally by reference numeral 10. In its most basic configuration, electronic device 10 includes a housing 12 and a face plate 14. Face plate 14 may be removably or fixedly mounted to housing 12 by any number of means known in the art so long as the face plate is mounted in such a way as to prevent the leakage of water into electronic device 10 at the mounting site.

Figure 12:
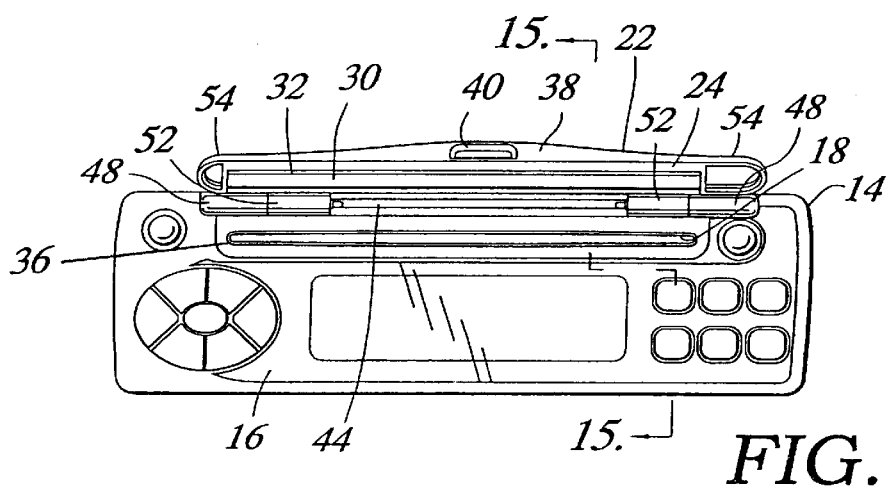
FIG. 12 is a front elevational view of the face plate illustrated in FIG. 1 with the water-tight door in the open position.

As best seen in FIGS. 1, 2 and 12, face plate 14 typically includes a display 16 having buttons, knobs or other function keys thereon. Face plate 14 also typically includes one or more openings 18 therein (FIG. 12), each opening being adapted to receive various components or accessories such as compact discs, cassettes, or the like. It will be understood and appreciated that the principles of the present invention equally apply to other types of openings in electronic devices including, but not limited to, openings for accepting communication devices and openings formed around the circumference of buttons,.knobs, or other function keys on the display. Such variations are contemplated to be within the scope hereof.

Opening 18 is covered by an apparatus 20 which provides a water-tight seal over the opening thus preventing water from entering therethrough, as more fully described below. As best seen in FIG. 12, apparatus 20 includes a door 22 which is hingedly mounted to face plate 14 as more fully described below. Door 22 includes an inward face 24 and an outward face 26, the outward face being visible when the door is in the closed position as illustrated in FIGS. 1 and 2. As best seen in FIG. 12, inward face 24 includes a recess 28 (FIG. 7) therein sized and shaped for receiving a gasket 30 and one or more fastening devices 32. Gasket 30 and fastening device 32 are coupled within the recess in inward face 24 by means well known in the art. The recess is of a depth that permits gasket 30 and fastening device 32 to interact with opening 18 and one or more receiving members 34 located on face plate 14 when door 22 is in its closed position, as more fully described below. Receiving member 34 is sized and shaped to be complementary to fastening device 32.

A ridge 36 typically surrounds and is adjacent to the opening 18, the ridge extending outwardly from the plane of face plate 14. When door 22 is in its closed position, gasket 30 interacts with ridges 36 and opening 18 to provide a water-tight seal, as more fully described below. Fastening device 32 is used to selectively couple door 22 to receiving member 34 depending on whether the door is in its open or closed position.

Fastening device 32 is preferably formed from a metallic material which is capable of being magnetically coupled with receiving member 34 as more fully described below. It will be understood and appreciated that fastening device 32 may be formed of plastic, rubber or any other such material so long as the fastening device and receiving members 34 are capable of being removably coupled with one another.

Preferably, fastening device 32 is fixedly attached within the recess by an adhesive. It will be understood and appreciated, however, that fastening device 32 may be coupled with door 22 by any type of attachment mechanism known in the art including, but not limited to, weldment.

In the preferred embodiment illustrated in FIG. 12, gasket 30 is rectangular in shape and extends a horizontal length at least slightly greater than that of opening 18. Gasket 30 is preferably made of a neoprene material. However, it will be understood and appreciated that gasket 30 may be made of any material having foam-like characteristics which also resists the passage of water. In the preferred embodiment, two fastening devices 32 are utilized, one located along each horizontal edge of gasket 30. In this configuration, gasket 30 snugly covers opening 18. Fastening devices 32 engage receiving members 34 when apparatus 20 is in its closed position, as more fully described below. It is within the scope of the present invention to adapt fastening device 32 such that it extends around the entire circumference of gasket 30 rather than just two sides thereof.

As best seen in FIGS. 2 and 12, door 22 is generally rectangular with rounded corners and is sized to cover an area at least slightly greater than opening 18. Door 22 may also cover one or more functional keys, for instance, accessory eject buttons, to prevent the ejection of the accessory when the door is in the closed position. It will be understood and appreciated that door 22 may be sized to cover any number of features of the electronic device as desired so long as it is large enough to permit the snug engagement between opening 18 and gasket 30, as more fully described below. All such variations are contemplated to be within the scope hereof.

Figure 10:
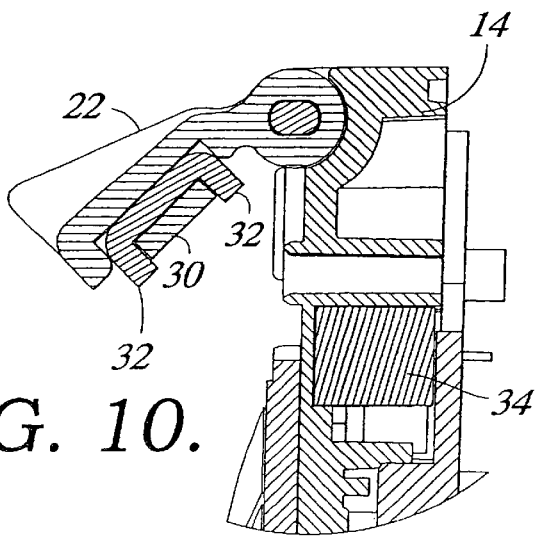
FIG. 10 is a cross-sectional view similar to that shown in FIG. 7 illustrating the door between the open and closed positions.

The outward face 26 of door 22 preferably is not planar but rather gradually increases in depth toward the center of the bottom edge 38 of the door. As such, the width of the bottom edge 38 of door 22 gradually is increased toward its center as best seen in FIGS. 3 and 10. Bottom edge 38 includes an indentation 40 positioned in the center thereof which is substantially rectangular in form. This configuration of bottom edge 38 and indentation 40 is integrally formed with door 22 to assist a user in selectively opening and closing the door with respect to face plate 14, as more fully described below.

Apparatus 20 is coupled with face plate 14 along a top edge 42 of door 22. Face plate 14 includes an elongated channel 44 located vertically above opening 18 and substantially flush with the top edge 46 of face plate 14. Channel 44 extends a horizontal length substantially equivalent to that of door 22 and is sized and shaped to complement the features of inward face 24 of door 22. Located at each horizontal end of channel 44 is a tubular member 48 adapted to receive a pin 50, as more fully described below. Tubular member 48 is closed at its distal end and open at its proximal end creating a hollow cavity therein which is accessible from only the proximal end.

At or near each distal end of door 22 and located vertically near top edge 42 on inward face 24, are two tubular structures 52, each structure being open on both ends creating a hollow cavity which is accessible from both the proximal and distal ends thereof. Tubular structures 52 are located inward from each side edge 54 of door 22 by a distance substantially equal to the horizontal length of tubular members 48. As such, when door 22 is coupled with face plate 14, tubular members 48 and tubular structures 52 line up, respectively, forming two hollow, elongated channels, one on each of the proximal and distal ends of channel 44. It will be understood and appreciated that if door 22 is extended on one or more sides to cover accessory buttons or the like, tubular structures 52 may be located inwardly by a distance greater than that of the structures themselves. Such is illustrated in FIG. 12.

Figure 9:
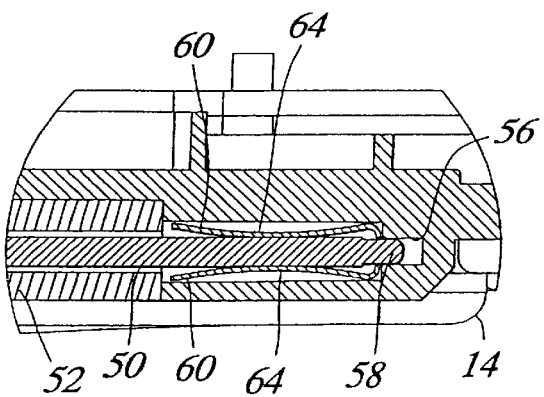
FIG. 9 is an enlarged view of the area encompassed by line 9 of FIG. 8.
Figure 11:
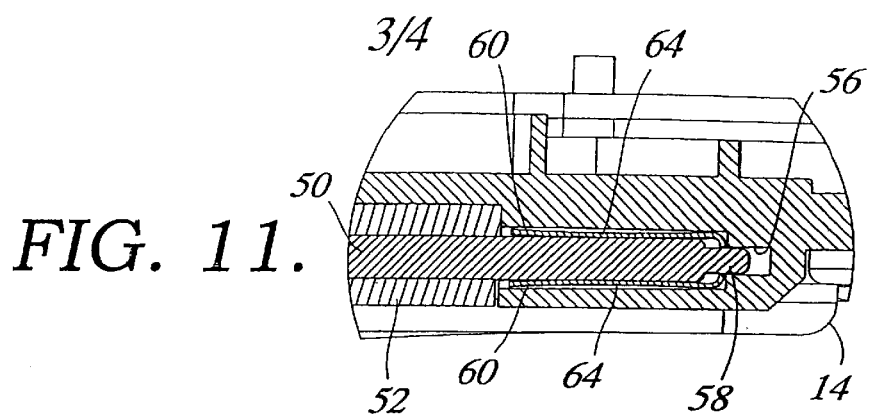
FIG. 11 is an enlarged view similar to that shown in FIG. 9 illustrating the closure mechanism when the door is between the open and closed positions.

Upon assembly, a pin 50 is inserted into each elongated channel extending through the tubular structures 52 and tubular members 48. At the distal end of the tubular members 48 at or near the closed end thereof is a notch 56. Each pin 50 is substantially oval in cross-section and is proportioned to be pivotally mounted within each elongated channel. As such, the distal end of each pin 50 includes a cylindrically-shaped flange 58 which is sized and shaped to be complementary to and fit within notches 56, as best seen in FIGS. 9 and 11.

Figure 8:
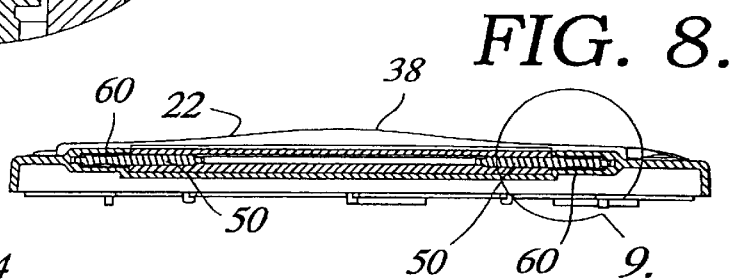
FIG. 8 is a cross-sectional view taken generally along line 8—8 of FIG. 2.

Located within tubular members 48 proximate notches 56 are a pair of brackets 60. Brackets 60 are used to mount pins 50 in the elongated channels and operate to bias door 22 in an open or closed position as desired. As best seen in FIGS. 8 and 9, it is preferred that brackets 60 are substantially U-shaped. Each bracket is adapted to be mounted within tubular members 48 such that they can receive pins 50 and include an aperture located at the distal end thereof, each aperture adapted to permit flanges 58 to pass therethrough and into notches 56. The center region 64 of each bracket is curved inwardly when door 22 is in the closed position, as best seen in FIG. 9. When door 22 is in the open position, there is less inward bias of bracket 60 as best seen in FIG. 11. It will be understood and appreciated that while in the preferred embodiment a biasing bracket is located at each distal end of channel 44, the use of a single biasing bracket is contemplated to be within the scope of the present invention.

Figure 17:
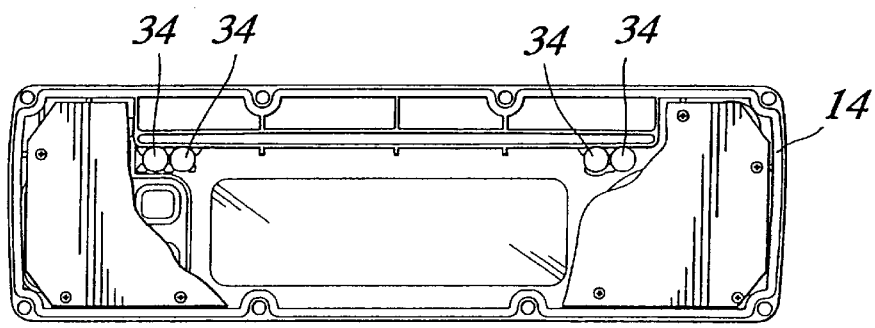
FIG. 17 is a rear elevational view of the face plate of the electronic device illustrating the receiving members positioned therein.

Receiving member 34 is used to couple fastening device 32 with face plate 14 when door 22 is in its closed position. As best seen in FIGS. 7 and 17, in the preferred embodiment, receiving member 34 includes four magnets fixedly mounted within face plate 14. The magnets are positioned vertically beneath opening 18 and adjacent fastening device 32 when door 22 is in its closed position. Specifically, two magnets are adjacently positioned on each side of center, just beneath opening 18. Magnets 34 are arranged in pairs, wherein each magnet is oriented in mutually opposite magnetic polarity, to achieve a significant amount of far-field cancellation and substantially reduce potential for magnetic interference to other equipment in the vicinity of the product. It will be understood that a plurality of magnets could be used to couple fastening device 32 to receiving member 34 so long as the field of each magnet is substantially reduced and the magnets provide the necessary force to maintain the seal between the fastening device 32, gasket 30 and opening 18. In addition, it is within the scope of this invention to selectively couple fastening device 32 and receiving member 34 by other means, such as a clip or a hook and loop material (e.g., VELCRO®) so long as the connection provides the necessary force to maintain the water seal between fastening device 32, gasket 30 and opening 18.

To couple apparatus 20 to face plate 14, tubular structures 52 are placed within channel 44 so that they align with the openings in tubular members 48. Each pin 50 is inserted through the openings in tubular structures 52 and into the proximal openings in tubular members 48. The flanges 58 of each pin 50 rest within notches 56. As such, flanges 58 are rotatably mounted in notches 56. An adhesive may be used to hold pins 50 in place within the elongated channels. Alternatively, the pin 50 may be fixedly mounted in another fashion, such as by a clip, pin, screw, or the like.

In operation, a user can selectively open or close apparatus 20 to prevent water from entering opening 18. In a closed position, pins 50 rest within the elongated channels as best seen in FIG. 7. Door 22 and fastening device 32 are positioned over opening 18 and abut the outer wall 70 of face plate 14. Specifically, a fastening device 32 is positioned above and below opening 18 and is removably coupled with face plate 14 by receiving member 34. Receiving member 34 magnetically attracts fastening device 32 thus selectively maintaining the closed configuration. As receiving member 34 magnetically couples fastening device 32 to face plate 14, gasket 30 is positioned against opening 18 causing ridge 36 to depress into gasket 30. Gasket 30 and ridge 36 thus form a seal which prevents water from entering opening 18.

Figure 13:
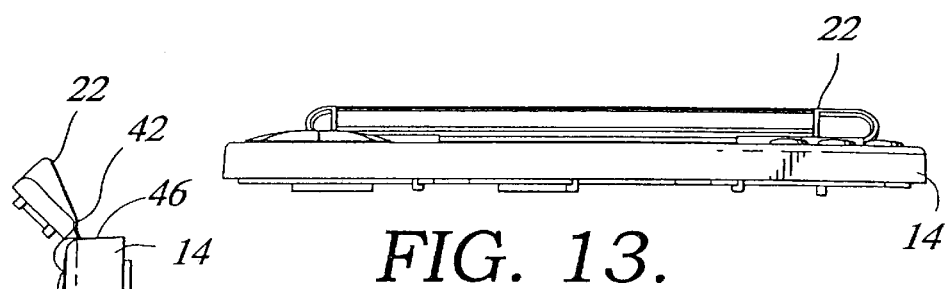
FIG. 13 is a bottom view of the face plate illustrated in FIG. 12.

As best seen in FIG. 10, a user can open door 22 to insert or remove an accessory or component, e.g., a compact disc or cassette, by grasping indentation 40 and rotating door 22 in an upward direction away from opening 18. As the user begins to rotate door 22, fastening device 32 moves away from face plate 14 and is released from receiving member 34. Simultaneously, gasket 30 moves away from ridge 36 as best seen in FIG. 13. The pivotal relationship of the attachment mechanism permits this movement with ease.

When door 22 and pin 50 is rotated to the open position as shown in FIG. 10, each 50 operates to exert an outward force on center region 64 of brackets 60 moving each bracket toward the inner wall of the elongated channel as best seen in FIG. 11. Center regions 64 and pins 50 are in constant contact with each other as door 22 is rotated about the pins. As the user continues to rotate door 22 to its open position, beyond the position illustrated in FIGS. 10 and 11, center regions 64 will bias or snap pin 50 to the position shown in FIG. 14, thus biasing the door to its open position.

Figure 14:
FIG. 14 is a side elevational view of the face plate illustrated in FIG. 12.
Figure 15:
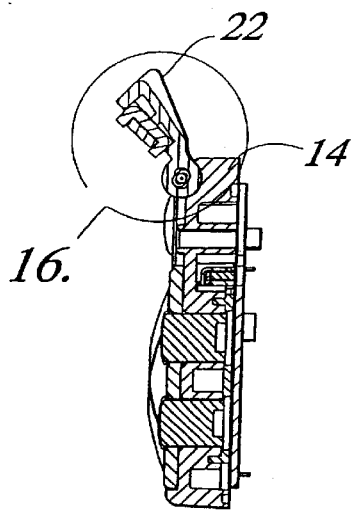
FIG. 15 across-sectional view taken generally along line 15—15 of FIG. 12 illustrating the water-tight door in the open position.
Figure 16:
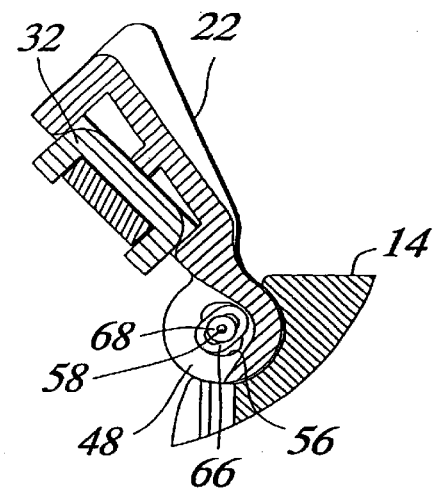
FIG. 16 is an enlarged view of the area encompassed by line "16," of FIG. 15.

As best seen in FIG. 14, door 22, fastening device 32 and gasket 30 are preferably placed in a position to allow a user to insert or remove various components or accessories, e.g., compact discs or cassettes, through opening 18. Door 22 is able to rotate about pins 50 until the top edge 42 of door 22 abuts the top edge 46 of face plate 14.

When returning door 22 to its closed position, a user grasps bottom edge 38 and rotates door 22 about the longitudinal axis of pins 50 toward opening 18. As the user begins to rotate door 22, fastening device 32 moves toward the outward facing surface 70 of face plate 14. As door 22 is closed, the oval cross-sectional shape of pins 50 operates to move center regions 64, of brackets 60 inwardly toward the center of the tubular member 48 biasing the door 22 in its closed position. Once door 22 has reached its fully closed position, fastening device 32 and gasket 30 interact with face plate 14 and opening 18 to form a water-tight seal as previously described.

Constructed and operated as previously described, this invention provides a cover for an opening in an electronic device which provides a water-tight seal and thus prevents water from entering the opening. In addition, this invention provides an apparatus that allows easy access to the electronic device while simultaneously providing protection from water entering an opening in the device. Further, the invention provides a water-tight closure apparatus for an opening in an electronic device which does not unduly hinder visibility of the electronic display.

In summary, the present invention is directed to a water-tight closure for an opening in an electronic device. The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well-adapted to attain the ends and aspects hereinabove set forth together with other advantages which are obvious and inherent to the structure. It will be understood that certain features and subcombinations are of utility and may be employed without reference to other features and subcombinations. This is contemplated by and is within the scope of the claims.

Having thus described the invention, what is claimed is:

1. An apparatus for sealing an aperture in a structure, the apparatus comprising:
    a structure having a substantially planar face plate with an opening therein, said substantially planar face plate having a ridge outwardly protecting therefrom surrounding and adjacent said opening;
    a cover pivotally coupled proximate a periphery thereof with said face plate at a position adjacent said opening, said cover having a length and width smaller than a length and width of said face plate which encompass the dimensions of said opening and extend therebeyond around beyond a periphery of said ridge when said cover is pivotally positioned over said face plate;
    a gasket carried by said cover on an inner wall thereof, said gasket positioned to extend beyond said periphery of said ridge when said cover is positioned over said face plate;
    a fastening member carried by said cover on said inner wall thereof; and
    a receiving member associated with said face plate and positioned to cooperate with said fastening member when said cover is positioned over said opening to maintain said cover in place over said opening and to compress said gasket by contact with said ridge to create a seal substantially preventing water from entering said opening.

2. The apparatus as recited in claim 1, wherein said fastening member and said receiving member are magnetically attracted to one another.

3. The apparatus as recited in claim 2, further comprising a plurality of fastening members arranged in pairs, wherein said fastening members of each pair are oriented in mutually opposite magnetic polarity.

4. The apparatus as recited in claim 1, wherein said gasket is formed from a neoprene material.

5. The apparatus as recited in claim 1, further comprising a biasing member, wherein said biasing member is located to bias said cover in one of two selective positions relative to said face plate.

6. An apparatus for sealing an aperture in an electronic device and for diverting water away from the aperture, the apparatus comprising:
    a structure having a substantially planar face plate with an opening therein, said substantially planar face plate having a ridge outwardly projecting therefrom surrounding and adjacent said opening;
    a cover pivotally coupled proximate a periphery thereof with said face plate at a position adjacent said opening, said cover having a length and width smaller than a length and width of said face plate which encompass the dimensions of said opening and extend beyond a periphery of said ridge when said cover is pivotally positioned over said face plate;
    a gasket carried by said cover on an inner wall thereof, said gasket positioned to extend beyond said periphery of said ridge when said cover is positioned over said face plate, a fastening member carried by said cover on said inner wall thereof; and a plurality of receiving members associated with said face plate and positioned to magnetically cooperate with said fastening member when said cover is positioned over said opening to maintain said cover in place over said opening and to compress said gasket by contact with said ridge to create a seal substantially preventing water from entering said opening.

7. The apparatus as recited in claim 6, wherein said gasket is formed from a neoprene material.

8. The apparatus as recited in claim 6, further comprising a biasing member, wherein said biasing member is located to bias said cover in one of two selective positions relative to said face plate.

9. An apparatus for providing a water-tight closure over an aperture in an electronic device, the, apparatus comprising:

a structure having a substantially planar face plate with an opening therein, said substantially planar face plate having a ridge outwardly projecting therefrom surrounding and adjacent said opening;

a cover pivotally coupled proximate a periphery thereof with said face plate at a position adjacent said opening, said cover having a length and width smaller than a length and width of said face plate which encompass the dimensions of said opening and extend beyond a periphery of said ridge when said cover is pivotally positioned over said face plate;

a gasket carried by said cover on an inner wall thereof, said gasket positioned to extend beyond said periphery of said ridge when said cover is positioned over said face plate, fastening means carried by said cover on said inner wall thereof; and receiving means associated with said face plate and positioned to cooperate with said fastening means when said cover is positioned over said opening to maintain said cover in place over said opening and to compress said gasket by contact with said ridge to create a seal substantially preventing water from entering said opening.

10. The apparatus as recited in claim 9, wherein said fastening means and said receiving means are magnetically attracted to one another.

11. The apparatus as recited in claim 9, wherein said gasket is formed from a neoprene material.

12. The apparatus as recited in claim 9, further comprising a biasing means, wherein said biasing means is located to bias said cover in one of two selective positions relative to said face plate.

13. A method for forming a water-tight seal over an aperture in an electronic device, said method comprising:

providing a structure having a substantially planar face plate with an opening therein said substantially planar face plate having a ridge outwardly protecting therefrom surrounding and adjacent said opening;

pivotally coupling a cover proximate a periphery thereof with said face plate at a position adjacent said opening, said cover having a length and width smaller than a length and width of said face plate which encompass the dimensions of said opening and extend beyond a periphery of said ridge when said cover is pivotally positioned over said face plate;

providing a gasket carried by said cover on an inner wall thereof, said gasket positioned to extend beyond said periphery of said ridge:

providing a fastening member carried by said cover on said inner wall thereof;

providing a receiving member associated with said face plate; and positioning said receiving member to cooperate with said fastening member when said cover is positioned over said face plate to maintain said cover in place, thereover and to compress said gasket by contact with said ridge to create a seal substantially preventing water from entering said opening.

14. The method as recited in claim 13, further comprising providing a biasing member located to bias said cover in one of two selective positions relative to said face plate.

15. An apparatus for providing a water seal over an aperture in an electronic device, said apparatus comprising:

a structure having a substantially planar face plate with an opening therein, said substantially planar face plate having a ridge outwardly projecting therefrom surrounding and adjacent said opening;

a cover pivotally coupled proximate a periphery thereof with said face plate at a position adjacent said opening, said cover having a length and width smaller than a length and width of said face plate which encompass the dimensions of said opening and extend beyond a periphery of said ridge when said cover is pivotally positioned over said face plate;

a gasket carried by said cover on an inner wall thereof, said gasket positioned to extend beyond said periphery of said ridge when said cover is positioned over said face plate;

a fastening device carried by said cover on said inner wall thereof; and receiving means associated with said face plate and positioned to magnetically cooperate with said fastening device when said cover is positioned over said opening to maintain said cover in place over said opening and to compress said gasket by contact with said ridge to create a seal substantially preventing water from entering said opening.

16. The apparatus as recited in claim 15, further comprising a biasing means located to bias said cover in one of two selective positions relative to said face plate.

* * * * *